(12) United States Patent
Geddes

(10) Patent No.: US 6,751,661 B1
(45) Date of Patent: Jun. 15, 2004

(54) METHOD AND SYSTEM FOR PROVIDING INTELLIGENT NETWORK MANAGEMENT

(75) Inventor: Norman D. Geddes, Cumming, GA (US)

(73) Assignee: Applied Systems Intelligence, Inc., Roswell, GA (US)

(*) Notice: Subject to any disclaimer, the term of this patent is extended or adjusted under 35 U.S.C. 154(b) by 606 days.

(21) Appl. No.: 09/598,971

(22) Filed: Jun. 22, 2000

(51) Int. Cl.⁷ ............................................. G06F 15/173
(52) U.S. Cl. ...................... 709/223; 709/202; 709/217; 709/218; 709/219; 709/224
(58) Field of Search .................. 709/223, 224, 709/202, 217–219

(56) References Cited

U.S. PATENT DOCUMENTS

| | | | |
|---|---|---|---|
| 4,881,230 A | 11/1989 | Clark et al. ................. 371/20.1 |
| 5,167,010 A | 11/1992 | Elm et al. ...................... 395/50 |
| 5,299,287 A | 3/1994 | Tsuruta et al. ................. 395/51 |
| 5,359,649 A | 10/1994 | Rosu et al. ................... 379/220 |
| 5,406,477 A | 4/1995 | Harhen ........................ 364/401 |
| 5,428,619 A | 6/1995 | Schwartz et al. ........... 371/20.1 |
| 5,434,952 A | 7/1995 | Yen et al. ...................... 395/50 |
| 5,442,731 A | 8/1995 | Tanaka et al. ................. 395/54 |
| 5,550,746 A | 8/1996 | Jacobs ................... 364/479.01 |
| 5,583,763 A | 12/1996 | Atcheson et al. ...... 364/551.01 |
| 5,586,254 A | 12/1996 | Kondo et al. ............ 395/200.1 |
| 5,644,727 A | 7/1997 | Atkins ........................ 395/240 |
| 5,655,081 A | 8/1997 | Bonnell et al. |
| 5,701,400 A | 12/1997 | Amado ........................ 395/76 |
| 5,706,406 A | 1/1998 | Pollock ........................ 395/55 |
| 5,712,960 A | 1/1998 | Chiopris et al. .............. 395/77 |
| 5,724,263 A | 3/1998 | Raguram et al. ............ 364/552 |
| 5,732,398 A | 3/1998 | Tagawa ........................... 705/5 |
| 5,745,895 A * | 4/1998 | Bingham et al. ............. 707/10 |
| 5,754,850 A | 5/1998 | Janssen ....................... 395/615 |
| 5,768,578 A * | 6/1998 | Kirk et al. ................... 707/100 |
| 5,799,317 A * | 8/1998 | He et al. .................. 707/104.1 |
| 5,809,212 A | 9/1998 | Shasha ........................ 706/46 |
| 5,835,922 A | 11/1998 | Shima et al. |
| 5,845,258 A | 12/1998 | Kennedy ........................ 705/8 |
| 5,893,083 A | 4/1999 | Eshghi et al. ................. 706/45 |
| 5,905,715 A | 5/1999 | Azarmi et al. .............. 370/244 |
| 5,918,207 A | 6/1999 | McGovern et al. ............ 705/1 |
| 5,953,707 A | 9/1999 | Huang et al. ................. 705/10 |
| 5,963,447 A | 10/1999 | Kohn et al. ............ 364/148.04 |
| 5,974,395 A | 10/1999 | Bellini et al. ................. 705/9 |
| 5,983,200 A | 11/1999 | Slotznick ..................... 705/26 |
| 5,995,959 A | 11/1999 | Friedman et al. |
| 6,006,192 A | 12/1999 | Cheng et al. ................... 705/7 |
| 6,012,044 A | 1/2000 | Maggioncalda et al. ...... 705/36 |
| 6,012,051 A | 1/2000 | Sammon, Jr. et al. ........ 706/52 |
| 6,012,152 A | 1/2000 | Douik et al. .................. 714/26 |
| 6,026,375 A | 2/2000 | Hall et al. .................... 705/26 |
| 6,049,742 A | 4/2000 | Milne et al. .................. 700/99 |
| 6,134,580 A | 10/2000 | Tahara et al. |
| 6,151,601 A | 11/2000 | Papierniak et al. |
| 6,247,012 B1 * | 6/2001 | Kitamura et al. ............. 707/10 |
| 6,272,482 B1 | 8/2001 | McKee et al. ................ 706/47 |
| 6,360,193 B1 * | 3/2002 | Stoyen ........................ 703/17 |
| 2001/0021917 A1 * | 9/2001 | Hatano ....................... 705/26 |
| 2002/0087496 A1 * | 7/2002 | Stirpe et al. ................. 706/45 |
| 2002/0095605 A1 * | 7/2002 | Royer et al. ................ 713/201 |

OTHER PUBLICATIONS

Written Opinion for Application No. PCT/US01/19714, dated May 18, 2002 (mailing date).
Preliminary Examination Report for Application No. PCT/US01/19716, dated Jul. 22, 2002 (mailing date).

(List continued on next page.)

*Primary Examiner*—Nabil El-Hady
(74) *Attorney, Agent, or Firm*—Kilpatrick Stockton LLP

(57) ABSTRACT

A network management system and method is disclosed for providing an intelligent decision support system for assisting human operators monitor, maintain, and diagnose and solve problems with a network. According to one embodiment, a system and method is provided that uses a partial order planner and a knowledge base to implement intelligent decision support using knowledge stored as plan and goal graphs, concept graphs, and/or scripts.

23 Claims, 9 Drawing Sheets

OTHER PUBLICATIONS

McCarthy, John, "Nonmonotonic Reasoning," *Partial Formalizations and the Lemmings Game* [online], Mar. 2, 1998 [retrieved on Dec. 10, 2003], Retrieved from the Internet: <http://www-formal.Stanford.edu/jmc/lemmings/node22.html>.

Kappa–PC, "Object Browser" [online], [retrieved on Dec. 8, 2003], Retrieved from the Internet: <http://www.intellicorp.com/products/kappapc/download/kappa_pc_download.htm>.

Corkill, Daniel D., "Blackboard Systems," *AI Expert*, vol. 6, No. 9, pp. 40–47, Sep., 1991.

Rich, Elaine, "Artificial Intelligence," pp. 40–45, 72–75, 201, 204–207, 214–223, 247–277, and 284–285, New York: McGraw Hill (ISBN 0–07–052261–8), 1983.

Preliminary Examination Report for Application No. PCT/US01/19714, dated May 27, 2003 (mailing date).

"ERP Goes Mid–Market," *Modern Materials Handling*, v. 55, n. 1, p. 65, Jan., 2000.

Jedd, Marcia, "The Next Big Thing," *World Trade*, v. 12, n. 2, pp. 60–62, Feb., 1999.

Geddes, N. D., Smith, D. M., and Kizza, C.S., (1998) *Fostering Collaboration in Systems, of Systems*, 1998 IEEE International Conference on Systems, Man and Cybernetics, Oct. 11–14, 1998, La Jolla, CA.

Geddes, N. D., and Lee, Robert J. (1998) *Intelligent Control for Automated Vehicles: A Decision Aiding Method for Coordination of Multiple Uninhabited Tactical Aircraft*, AUVSI '98 25th Annual Symposium and Exhibition, Jun. 8–12, 1998, Huntsville, AL.

Collis, J. C. and Lee, L. C., *Building Electronic Marketplaces with the ZEUS Agent Tool–Kit*, Agent Mediated Electronic Commerce, First International Workshop on Agent Mediated Electronic Trading, AMET–98, May 10, 1998, Minneapolis, MN.

Geddes, N. D., (1997) *A Portable Lightweight Associate For Urban Helicopter Pilotage*, 16th AIAA Digital Avionics Systems Conference, Oct., 1997, Irvine, CA.

Geddes, N.D., (1997) *Associate Systems: A Framework for Human–Machine Cooperation*, HCI Conference, Aug. 24–29, 1997, San Francisco, CA.

Geddes, N. D., (1997) *Human Centered Approaches to Mixed Initiative Planning*, May 6, 1997, DARPA P&DA Program.

Wegner, Peter, "Shy Interaction is More Powerful Than Algorithms," *Communications of the ACM*, v. 40, n. 5, pp. 80–91, May, 1997.

Geddes, N. D., (1997) *Large Scale Models of Cooperative and Hostile Intentions*, IEEE Computer Society International Conference and Workshop on Engineering of Computer Based Systems, (ECBS '97), Mar. 24–28, 1997, Monterey, CA.

Gilbert, D. and Janca, P., *Intelligent Agents: Internet Usability Enhancers*, 19th Annual Pacific Telecommunications Conference, PTC '97, pp. 677–682.

"Smart Move in a Networked World," *Computer Reseller News*, 1997, n. 731, p. 117.

Ross, Julie Ritzer, *"Intelligent Agent" Test Probes Consumers' On–Line Shopping Needs*, Stores, v. 78, n. 11, pp. 47–8, Nov., 1996.

Geddes, N. D., and Brown, J. L., (1996) *A Shared Model of Intentions for Free Flight*, AIAA/IEEE Digital Avionics Systems Conference, 179–184, Oct. 27–31, 1996, Atlanta, GA.

Houlder, Vanessa, *Technology: Fingers That Shop Around Retailing Faces on Upheaval Caused by "Intelligent Agents" on the Internet*, Financial Times London Edition, p. 14, Sep. 24, 1996.

"Andersen Project Examines How Electronic Merchants Can Better Target Customers," *Software Industry Report*, v. 28, n. 17, p. 1(2), Sep. 2, 1996.

"New Intelligent Agent Tackles Internet Privacy Issues: Andersen Consulting Experiment Examines How Electronic Merchants Can Better Target Customers in Cyberspace," *Business Wire*, p. 8271291, Aug. 27, 1996.

Renwei, Li and Pereira, L. M., *Knowledge–Based Situated Agents Among Us, Intelligent Agents III, Agent Theories, Architectures and Languages*, ECAI '96 Workshop, Aug. 12–13, 1996, Budapest, Hungary.

Laborie, P. and Ghallab, M., *Planning With Sharable Resource Constraints*, IJCAI–95 Proceedings of the 14th International Joint Conference on Artificial Intelligence, vol. 2, pp. 1643–1649, Aug. 20–25, 1995, Montreal, Quebec, Canada.

Correll, James G., "Re–Engineering the MRP II Environment: The Key is Successfully Implementing Change," *IIE Solutions*, v. 27, n. 7, pp. 24–27, Jul., 1995.

Shalin, V. L. and Geddes, N. D., (1994) *Task Dependent Information Management in a Dynamic Environment: Concept and Measurement Issues*, IEEE 1994.

Geddes, N. D., (1994) *A Model for Intent Interpretation for Multiple Agents with Conflicts*, IEEE International Conference on Systems, Man and Cybernetics, Oct. 2–5, 1994, San Antonio, TX.

Soutchanski, M. and Ternovskaia, E., *Logical Formalization of Concurrent Actions for Multi–Agent Systems, Intelligent Agents*, ECAI–94 Workshop on Agent Theories, Architectures and Languages, Aug. 8–9, 1994, Amsterdam, Netherlands.

Etzioni, Oren and Wel, Daniel, "A Softbot–Based Interface to the Internet," *Communications of the ACM*, v. 37, n. 7, pp. 72–76, Jul., 1994.

Eklund, Peter W., "Research Developments in Multiple Inheritance with Exceptions," *The Knowledge Engineering Review*, v. 9, n. 1, pp. 21–55, Mar., 1994.

Shalin, V. L., Geddes, N. D., Mikesell, B., and Ramamurthy, M., (1993) *Evidence for Plan–Based Performance and Implications for Information Management on the Commercial Aviation Flight Deck*, 4th International Conference on Human–Machine Interaction and AI in Aerospace, Sep. 1993, Toulouse, France.

Shalin, V. L., Geddes, N. D., et al., (1993) *Expertise in Dynamic Physical Task Domains*. To appear in Feltovich, P., for, K. & Hoffman, R. (Eds.), *Expertise in Context: Human and Machine*.

Miller, C. A., Shalin, V. L., Geddes, N. D., and Hoshstrasser, B., (1992) *Plan–Based Information Requirements: Automated Knowledge Acquisiton to Support Information Management in an Intelligent Pilot–Vehicle Interface*, Proceedings of the 11th Digital Avionics Systems, Conference, Seattle, WA, 1992.

Geddes, N. D., Pullum, L., and Hoffman, M. A., (1992) *Intelligent Interfaces in Command and Control Systems*, Proceedings of IEEE Conference on C31 Technology and Applications, Jun. 1–4, 1992, Rome, NY.

Shalin, V. L., Miller, C. A., Geddes, N. D., Hoshstrasser, B. D., and Levi, K. R., (1992) *AI Plan as Indicators of Human Information Requirements*.

Geddes, N. D., and Hammer, J. M., (1991) "Automatic Display Management Using Dynamic Plans and Events," *Proceedings of the 6th Symposium on Aviation Psychology,* May 6–11, 1991, Columbus, OH.

Edwards, G. R., and Geddes, N. D., (1991) "Deriving a Domain–Independent Architecture for Associate Systems From Essential Elements of Associate Behavior," *Associate Technology: Opportunity and Challenges,* Lehner, P. E. (Editor), Fairfax, VA: George Mason University, Jun., 1991, pp. 17–29.

Lizza, C. S., Banks S. B., (1991) *Pilot's Associate: A Cooperative, Knowledge–Based System Application,* DARPA Strategic Computing Initiative, IEEE Expert, Jun., 1991.

Chandrasekaran, B., Bhatnagar, R., and Sharma, D. D., "Real–Time Disturbance Control," *Communications of the ACM,* v. 34, n. 8, p. 32(16), Aug., 1991.

Shalin, V. L., Geddes, N. D., Hoshstrasser, B. D., Miller, C. A., Levi, K. R., and Persbacher, D. L., (1990) "Towards a Theory of Pilot Information Requirements During Plan Development and Execution," *Proceedings of CERT 90,* Toulouse, France.

Sewell, D. R., and Geddes, N. D., (1990) "A Plan and Goal Based Method for Computer–Human System Design," *Human Computer Interaction: INTERACT 90,* New York: North Holland, 283–288.

Rouse, W. B., Geddes, N. D., and Hammer, J. M., (1990) "Computer–Aided Fighter Pilots," *IEEE Spectrum,* Mar., 1990, 38–41.

Geddes, N. D. and Hoffman, M.A., (1990) "Supervising Unmanned Roving Vehicles Through an Intelligent Interface," *Proceedings of the 1990 Space Operations and Robotics Conference,* Albuquerque, NM.

Hoshstrasser, B. D. and Geddes, N. D., (1989) "OPAL: Operator Intent Inferencing for Intelligent Operator Support Systems," *Proceedings of the IJCAI–89 Workshop on Integrated Human–Machine Intelligence in Aerospace Systems,* Shalin, V. L. and Boy, G. A. (Editors), Aug., 1989, Detroit, MI.

Webb, B. W., Geddes, N. D., and Neste, L. O., (1989) "Information Management with a Hierarchical Display Generator," *Proceedings of the National Computer Graphics Association,* Washington, DC.

Howard, C. W., Hammer, J. M., and Geddes, N. D., (1988) "Information Display Management in a Pilot's Associate," *Proceedings of the 1988 Aerospace Applications of Artificial Intelligence Conference,* 1, 339–349.

Sewell, D. R., Geddes, N. D., and Rouse, E. B., (1987) "Initial Evaluation of an Intelligent Interface for Operators of Complex Systems." In G. Salvendy (Eds), *Cognitive Engineering in the Design of Human–Computer Interaction and Expert Systems* (551–558), New York: Elsevier.

Rouse, W. B., Geddes, N. D., and Curry, R. E., (1987) "An Architecture for Intelligent Interfaces: Outline of an Approach to Supporting Operators of Complex Systems," *Human–Computer Interaction,* 3, 87–122.

Hammer, J. M. and Geddes, N. D., (1987) *Design of an Intelligent Monitor for Human Error in a Complex System,* Paper presented at AIAA Computers in Aerospace VI Conference, Wakefield, MA.

Geddes, N. D., (1986) "The Use of Individual Differences in Inferring Human Operator Intentions," *Proceedings of the Second Annual Aerospace Applications of Artificial Intelligence Conference,* 30–41.

Geddes, N. D., (1985) "Intent Inferencing Using Scripts and Plans," *Proceedings of the First Annual Aerospace Applications of Artificial Intelligence Conference,* 160–172.

Preliminary Examination Report for Application No. PCT/US01/19652, dated Feb. 11, 2003 (mailing date).

International Search Report for Application No. PCT/US01/19652, dated Nov. 6, 2001 (mailing date).

International Search Report for Application No. PCT/US01/19716, dated Oct. 10, 2001 (mailing date).

International Search Report for Application No. PCT/US01/19714, dated Sep. 18, 2001 (mailing date).

Kanai, Naoki et al., "An Expert System to Assist Production Planning," *IEEE, International Workshop on Artificial Intelligence for Industrial Applications,* pp. 219–224, 1998.

* cited by examiner

METHOD AND SYSTEM FOR PROVIDING INTELLIGENT NETWORK MANAGEMENT

COPYRIGHT NOTICE

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates to the monitoring and management of voice, video and data networks, and more particularly, to the use of decision support systems to assist operators in managing network devices and network interconnections. The present invention provides an intelligent decision support system for management of distributed data and voice networks using a partial order planner.

BACKGROUND INFORMATION

Communication (voice, data, and video) networks are increasingly becoming mission critical components of businesses. As companies become more dependent on their networks, the cost of network outages increases tremendously in lost revenue and lost productivity.

Today, various network management packages such as Hewlett-Packard OpenView™ and LeCroy Vigilant Networks™ provide tools to monitor computer networks, alerting operators when problems are detected. Most of the available systems use the Simple Network Management Protocol (SNMP) to monitor various network devices, periodically polling the devices by pinging the devices or by sending out a SNMP request. If a device fails to respond, then the system notifies an operator and the device is identified as unreachable on the network management console.

Vigilant Networks™ provides some added features that help to identify certain network problems such as network congestion and network errors. This system is superior to previous network management systems in that it is able to monitor additional information that may identify problems that are slowing down a computer network regardless of whether a failure occurs. Basically, the Vigilant Networks™ system works by providing additional network information and statistics related to the physical network layer to the management console.

As networks become larger and more complex, operators are increasingly deluged with unmanageable amounts of data. At the same time, network quality of service goals require rapid response to any degradation or hostile network traffic. There is a great desire for an intelligent network management solution that assist network operators in monitoring and managing large complex networks.

As communication networks increase in size, so to does the complexity of network management. It was once easy to visualize the components of a network so that a single operator could quickly determine a likely point of failure of a device and fix the problem. Today, networks are becoming too large for operators to ponder all of the interrelations between thousands of network components to determine the cause of a problem. There is a desire for a system and method that can assist a user in narrowing down the possible causes of a performance problem and suggest or implement potential solutions beyond mere fault detection.

Modern networks are often critical to the successful operation of a business or industrial process. When degradation or malfunctions within network devices have been diagnosed, it is often necessary to reconfigure the network devices and their data as rapidly as possible so that quality of service can be maintained. There is a desire for an intelligent network management solution that assists in performing network reconfigurations in order to rapidly carry out a planned network response to a disturbance.

Additionally, using such services as the Simple Network Management Protocol (SNMP), operators can monitor large amounts of data from a central console. As networks grow, the amount of data becomes unwieldy. Data only becomes information to a user by virtue of its relevance to the user's active goals and methods for achieving them. The modem network operator finds himself data rich, but information poor. There is a desire to provide a system and method for assisting a human operator by displaying the information most pertinent to the operator's goals or plans.

The large size, complexity, and distributed nature of networks often result in the need to employ many human network technicians, who are simultaneously interacting with different network devices at remote locations and with different intentions. These activities can produce unexpected network degradation and outages due to unexpected interactions between the separate technical activities. There is a need for an intelligent network management solution that can detect potential degrading interactions between network operations and activities before they occur.

Finally, there is a desire to provide a network management console that interprets the intentions of a human operator and adjusts the information displayed on the network management console based on the user's intention.

Several patents disclosing network management systems have been issued by the United States Patent and Trademark Office. For example, U.S. Pat. No. 5,359,649 issued to Rosu et al. (the '649 patent) discloses a system for optimizing the traffic capacity of a telecommunications network by receiving traffic data from each exchange in the network and dynamically fine tuning the congestion condition. The '649 patent does not disclose an intelligent decision support system that can determine the intention of the user and adjust a display console based on that intent. In addition, it describes how to tune for traffic capacity but not for revenue, which is a completely different need for modem network managers.

Additionally, U.S. Pat. No. 5,905,715 issued to Azarmi et al. (the '715 patent) discloses a network management application that receives data from a network, analyzes it, and acts on it by issuing reports and control outputs appropriately. This system does not provide for active, goal-directed planning nor conflict detection across multiple independent actors as does the present invention.

Finally, U.S. Pat. No. 5,963,447 issued to Kohn et al. (the '447 patent) discloses a system of distributed agents working together in a network to control complex distributed processes. This system shows one way in which a collection of intelligent agents can interact and cooperate to achieve goals; however, the '447 patent discloses using the technology to build control systems and not an intelligent decision support system that assists multiple human network controllers and operators such as that provided by the present invention.

There is a need for an intelligent decision support system that improves on the prior art by providing user intent inferencing so that system can update displays and make suggestions based on the current intent of a user. There is a need for a system that is able to detect conflicts between the intentions and operational plans of multiple network operators. There is also a need for a system that uses a partial-order planner to provide real-time intelligent decision support to a user across very large network systems.

SUMMARY OF THE INVENTION

In accordance with the invention, a method for providing intelligent decision support in a network management system is provided. The method includes monitoring actions received by a network management console. The actions received are used to interpret the intent of a human operator. Finally, the method includes updating the network management console display based on the determined intent of the human operator. More specific embodiments include monitoring for one or more key presses, mouse clicks, and mouse movements to assist in determining the intentions of a network operator. A more specific embodiment also includes determining a plan for carrying out a determined intention. In some embodiments, the plan is created using an inference engine which can include a non-monotonic truth maintenance system, and a partial-order planner. Finally, a more specific embodiment includes monitoring communications networks used to transport data communications, voice communications, and video communications.

According to another aspect of the present invention, an intelligent decision support system is provided for managing a communications network. The system includes a knowledge base encoding expert knowledge about communication networks, an inference engine, a network management system, and a graphical user interface. The inference engine is coupled to the knowledge base and is used to determine the intent of a network operator. The network management system is used to collect data from a plurality of network devices, and the graphical user interface displays information regarding the communications network. The intelligent decision support system modifies the information displayed by the graphical user interface based on the determined intent of the network operator.

Further, more specific embodiments of the present invention represent knowledge as plan and goal graphs, concept graphs, and/or scripts comprising sequences of partially-specified primitive network control actions. Some embodiments use an inference engine including a partial order planner, and/or a nonmonotonic truth maintenance system.

Embodiments of the present invention can be used to manage communications networks transporting data communications, voice communications, and video communications.

BRIEF DESCRIPTION OF THE DRAWINGS

The present invention is further described in the detailed description which follows, by reference to a plurality of drawings by way of non-limiting examples of illustrated embodiments of the present invention, in which like reference numerals represent similar parts throughout the several drawings, and wherein.

GLOSSARY

Figure 1:
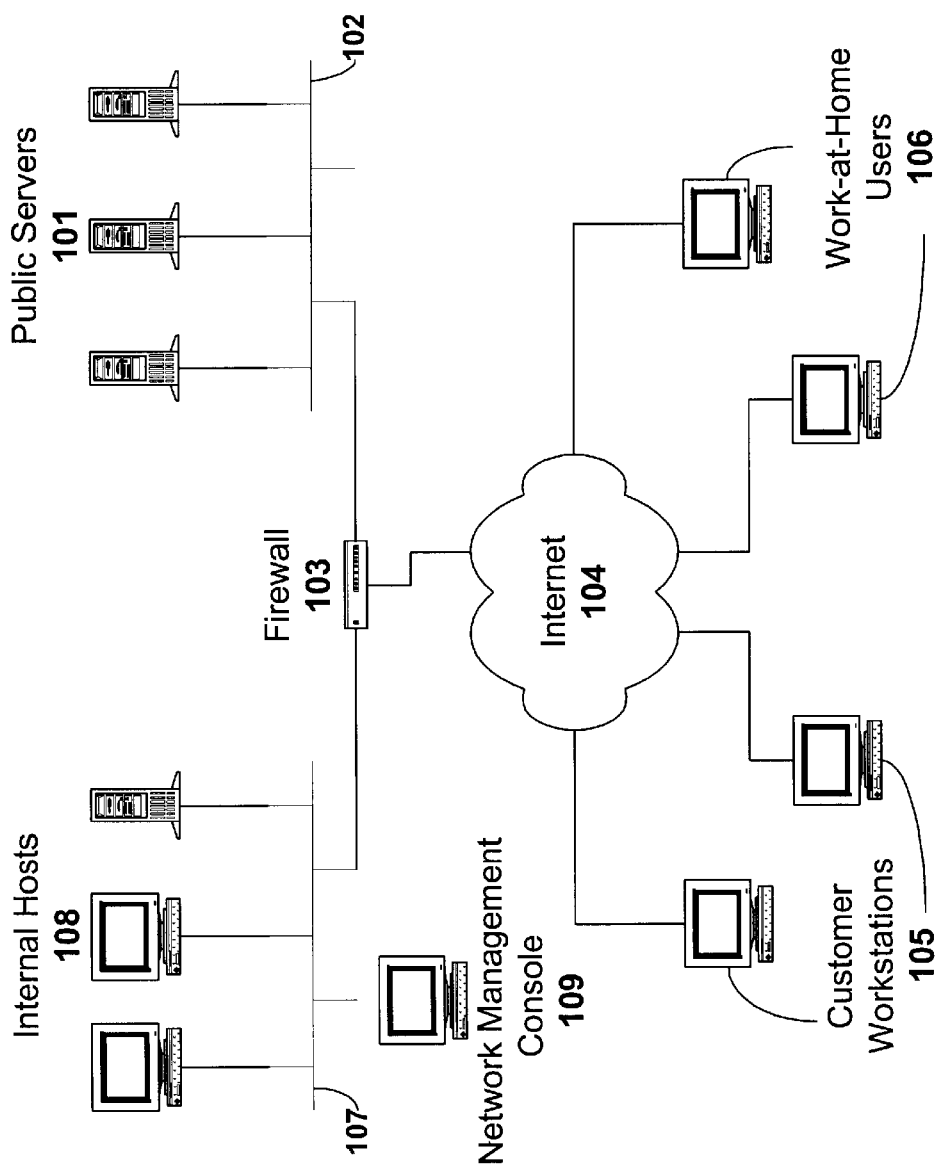
FIG. 1 is a schematic diagram illustrating a representative computer network that is managed by an embodiment of the present invention.

Concept Graph: a knowledge representation of the dependencies between observable data values and higher-level computations and assertions made about the data. A concept graph can be implemented as a directed acyclic graph of concept nodes that is a particular type of augmented transition network (ATN).

Expert System: a computer program that uses a knowledge base to assist in solving problems. Most expert systems use an inference engine to derive new facts and beliefs using a knowledge base.

Full-Order Planner: (also called a total-order planner) a process that computes a fully-ordered list of primitive steps or actions to reach a goal, in which each step or action is fully definitized at the completion of the planning process.

Inference Engine: a computer program that infers new facts or beliefs from known facts or beliefs using a knowledge base and a set of logical operations.

Intent Interpreter: an expert system that uses a knowledge base to determine the present intention of a user or a system.

Knowledge Base: a collection of knowledge (e.g., objects, concepts, relationships, facts, rules, etc.) expressed in a manner such that it can be used by an inference engine. For example, a knowledge base may include rules and facts or assertions as in traditional expert systems.

Least Commitment Planner: a process that generates a plan that avoids making a choice between two or more alternative courses of action unless it is necessary to do so. A least commitment planner avoids definitizing any particular sub-element of a plan beyond the minimum necessary to determine likely success. Final definitization of the primitive steps is deferred until just prior to the execution of each plan sub-element by a plan execution agent.

Primitive step. a representation of an activity that is not further decomposed by a planner. Also called a primitive action.

Partial-Order Planner: a process that generates a partially ordered set of activities at the completion of the planning process.

Plan. a abstract representation of a set of activities to be performed from the present into the future. A plan may be decomposable into plan sub-elements that define more detailed activities. The lowest level of decomposition of a plan is a primitive step or action.

Plan Execution Agent. a process that directly operates on the environment by performing activities represented by a plan.

Plan-Goal Graph (PGG): a knowledge representation for expressing causal relationships in an operational domain as well as the intentions of a user. A PGG can be expressed as an acyclic, directed graph where plans are decomposed into subgoals or primitive actions.

Planner: a computer program that determines a sequence of operations or actions to be taken to reach one or more goals.

Non-Monotonic Truth Maintenance: a system for maintaining the consistency of beliefs, assumptions, justifications and/or assertions in a knowledge base wherein knowledge can be retracted when an inconsistency is detected.

DETAILED DESCRIPTION OF THE ILLUSTRATED EMBODIMENTS

The present invention includes methods and systems for providing intelligent decision support services to a network operator. FIG. 1 depicts a computer network that is representative of networks managed according to various illustrative embodiments of the present invention. This computer network is an Ethernet-based network given by way of example only. One of ordinary skill in the art will understand that the present invention can be used with many network topologies and architectures. For example, the present invention can be used with Asynchronous Transfer Mode (ATM) switches, Token Ring networks, Fiber Channel networks, or any other networks now available or available in the future. Additionally, one of ordinary skill in the art will readily appreciate that the present invention can be used on any other communications network including, but not limited to the following: public or private voice networks, such as the Public Switch Telephone Network (PSTN) or Private Branch Exchanges (PBXs); public or private data networks, such as intranets, AOL™, or wireless networks; and public or private video networks.

The various embodiments of the present invention improve on traditional artificial techniques. One of ordinary skill in the art may find the following references helpful in providing appropriate background understanding in the design and construction of inference engines, knowledge bases, and various knowledge representations used by the present invention: (1) Schank, R. C. and Abelson, R., Scripts, Plans Goals and Understanding, Hillsdale, N.J.: Lawrence Erlbaum Associates (1977); (2) Schank, R. C. and Riesbeck, C. K., Inside Computer Understanding. Hillsdale, N.J.: Lawrence Erlbaum Associates (1981), (3) Sacerdoti, E. D., A Structure for Plans and Behaviors, New York: Elsevier (1978); (4) Rinnooy Kan, A.H.G., Machine Scheduling Problems. The Hague: Martinus Nijhoff (1976); and (5) Charniak, E, Riesbeck, C. K. and McDermott, D., Artificial Intelligence Programming. Hillsdale, N.J.: Lawrence Erlbaum Associates (1980).

Figure 2:
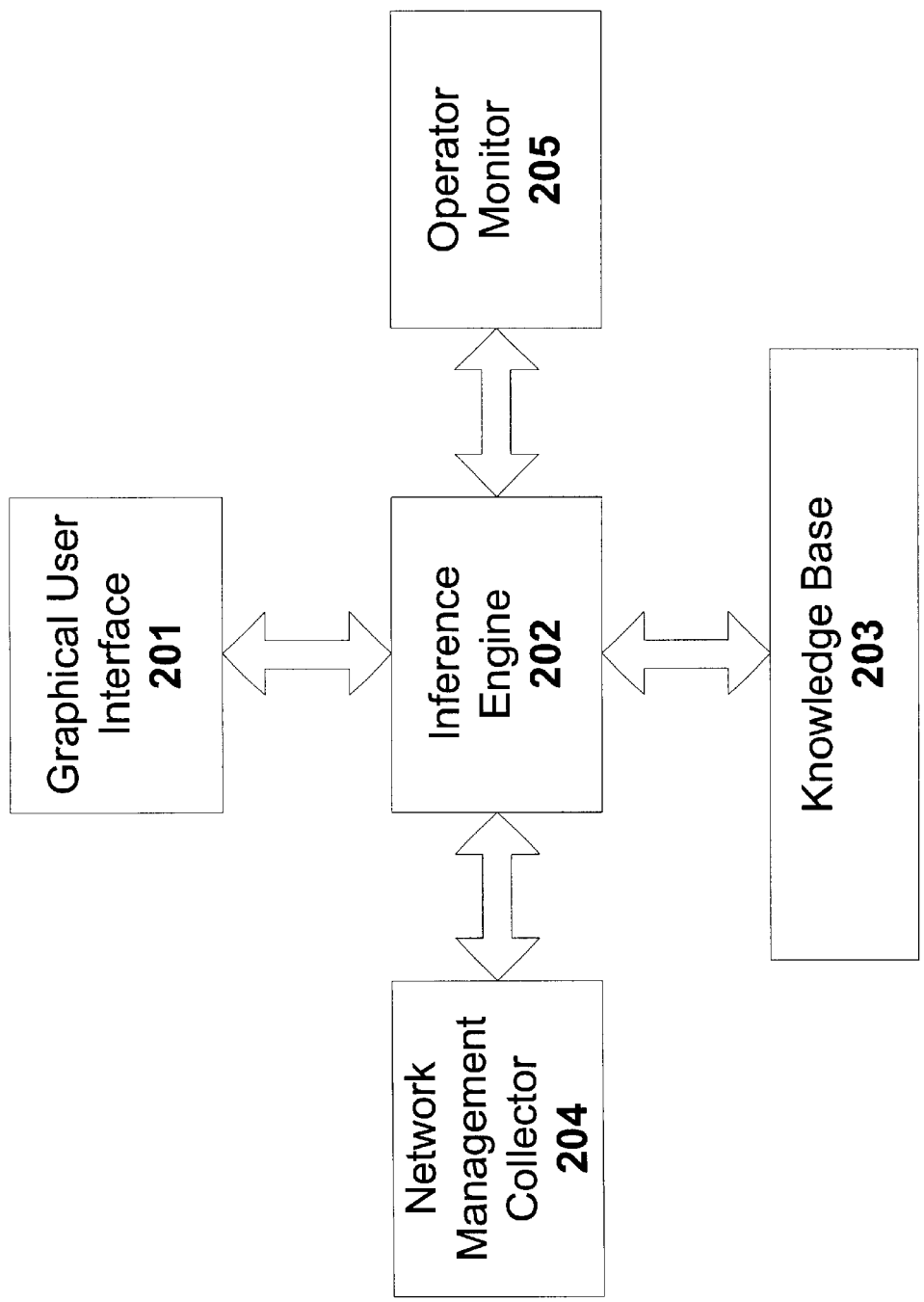
FIG. 2 depicts a block diagram showing the software components of one embodiment of the present invention.

The simplified network topology shown in FIG. 1 is an example of an architecture that could be used by a company to provide services to remote customers. Servers 101 include web servers, mail servers, news servers, etc. for providing public communications and electronic commerce services for a company. These public servers are required to provide some access to machines on the Internet, beyond the control of the company. Because of the nature of these servers, there is an inherent security risk. For this reason, servers 101 are placed on a separate network with increased security commonly called a demilitarized zone (DMZ). FIG. 2 depicts DMZ 102 behind a firewall 103 to provide isolation from the company's internal network 107 and to provide protection from unauthorized access from the Internet 104.

The company's internal network 107 includes one or more internal hosts 108 that are used by company employees for day to day business needs, such as planning, design, development, and operations. It is imperative that this network operates reliably and continuously so that the company's automation and communication activities are not interrupted.

External hosts such as customer workstations 105 and work-at-home users 106 access the company's network through the Internet 104. For example, customers 105 may view information, send electronic mail, conduct electronic commerce, etc. using the company's web servers or other public servers 101. An employee working at home may access the company's internal network 107 to assist in performing required tasks.

It is imperative for the company to maintain a fully functional network architecture, therefore a network management console 109 is used to monitor the various network devices such as hubs, routers, switches, firewalls, servers, hosts, workstations, etc.

The first embodiment of the present invention is an intelligent decision support system for managing a computer network as shown in FIG. 2. The system is embodied as a network management console 109 on an Intel™-based computer system running Microsoft Windows 2000™ operating system. The network management console 109 connects to the internal network 107 using a conventional network interface device. In other embodiments, the network management console 109 includes a plurality of network interface devices to provide increased redundancy and to decrease the amount of network management traffic that must be sent from one segment of a network to another. In this embodiment, with a plurality of network consoles and operators, the intelligent network management system detects potential conflicting activities between network operators and advises the operators of the nature of the potential conflicts.

The network management console 109 is embodied as a web-based application. The primary interface to end users is a web server application such as the Microsoft Internet Information Server™ (IIS). The present embodiment is implemented using Java™ and Active Server Pages™ (ASPs) served by an IIS server running on network management console 109. Thus, a network operator can access the system by running a web browser such as Internet Explorer™ or Netscape Communicator™ on the network management console 109, or on another host connected to internal network 107.

Next, we turn to the software configuration of the network management console 109 as shown in FIG. 2. Inference engine 202 is coupled to knowledge base 203 to perform various tasks such as determining the intent of a network operator, determining goals that the human operator needs or desires to meet, determining the state of the network and its operational condition, determining plans to meet these goals, and to determine what information needs to be displayed to the network operator. The knowledge base 203 includes expert knowledge about communication networks. This knowledge is encoded using traditional knowledge engineering techniques known to those of ordinary skill in the art.

Coupled to inference engine 202 is the operator monitor 205 component. The operator monitor 205 monitors and records when a user presses a key, moves the mouse, or presses a mouse button. The information collected can then be used by inference engine 202 to determine the present intention of a human operator. The intentions of the human operators are monitored by the operator monitor 205 to detect any conflicts in intended activities between a plurality of operators.

Inference engine 202 is also coupled to the network management collector 204. This component monitors the communications network using conventional technology such as by sending pings or SNMP requests to network devices. The data collected is incorporated into knowledge base 203 in order to assist the inference engine 202 in performing its functions.

Finally, inference engine 202 is coupled to a graphical user interface 201 component that facilitates input and output with a network operator. The graphical user interface 201 output is dependent on the current state of the system as determined by the inference engine 202.

We now describe the operation of a system according to one embodiment of the present invention with reference to the computer network architecture shown in FIG. 1. In this embodiment, we use a simplified model of network operator intent consisting of three activities: (1) nominal network operations (all clear), (2) respond to security event (security incident), and (3) respond to network fault (network outage). The information needed by the network operator differs for each of the three system technical activities.

The system begins in the all clear state, with the operator activity being nominal network operations. For this activity, the system displays a network diagram similar to conventional network management systems. The monitored network devices are shown in a color indicative of the devices' status. For example, a device is displayed in green if it is fully functional, in yellow if there are warning messages or other informational messages available, and in red if the device is down or there has been a critical event detected.

The system remains in the all clear state until the network management collector 204 detects a change in the status of a device, or until the inference engine 202 detects a new intention of the network operator. For example, if the network operator begins viewing the firewall 103 log files and logs on to public servers 101, the inference engine may determine that the operator's activity has changed from nominal network operations to respond to security event. In that case, the graphical user interface 201 changes the display to show information that may help the network operator diagnose and resolve security problems. In this case, the graphical user interface 201 displays the logfiles from the public servers 101 as well as the firewall 103 logfile.

As another example, a customer calls and complains that she cannot access the server. The network operator needs to determine whether the problem is with the company's network devices or with the Internet access provided by a third party. To resolve the problem, the network manager begins tracing packets between the DMZ 102 and hosts on the Internet 104. The inference engine 202 detects the change in the network operator's intent and updates the display accordingly. In this example, if the operator's change in activity to trace packets as a part of the response to a network malfunction creates a conflict with another operator's intent to respond to a security event in another part of the network, the conflict is detected and both operators are advised of the conflict situation so that they can coordinate their activities.

One of ordinary skill in the art will appreciate that many additional modifications of this embodiment may be made without departing from the present invention. For example, the system can be made to automatically correct some common errors that occur. For example, if the web server software occasionally experiences problems requiring that the software be restarted, knowledge about detecting the problem and resolving the problem can be encoded in the knowledge base 203. Then, the system can automatically correct the problem whenever it occurs.

Additionally, the system can be integrated into an advanced notification system allowing messages to be sent using electronic mail, an integrated voice response (IVR) system, a paging system, or any other communications means.

One of ordinary skill in the art will appreciate that there are many variations of the software and hardware configuration that we have just discussed. For example, the network management console 109 can be embodied as on a UniX™ platform using Hewlett Packard™, Sun Microsystems™, or Intel™-based computers.

Figure 3:
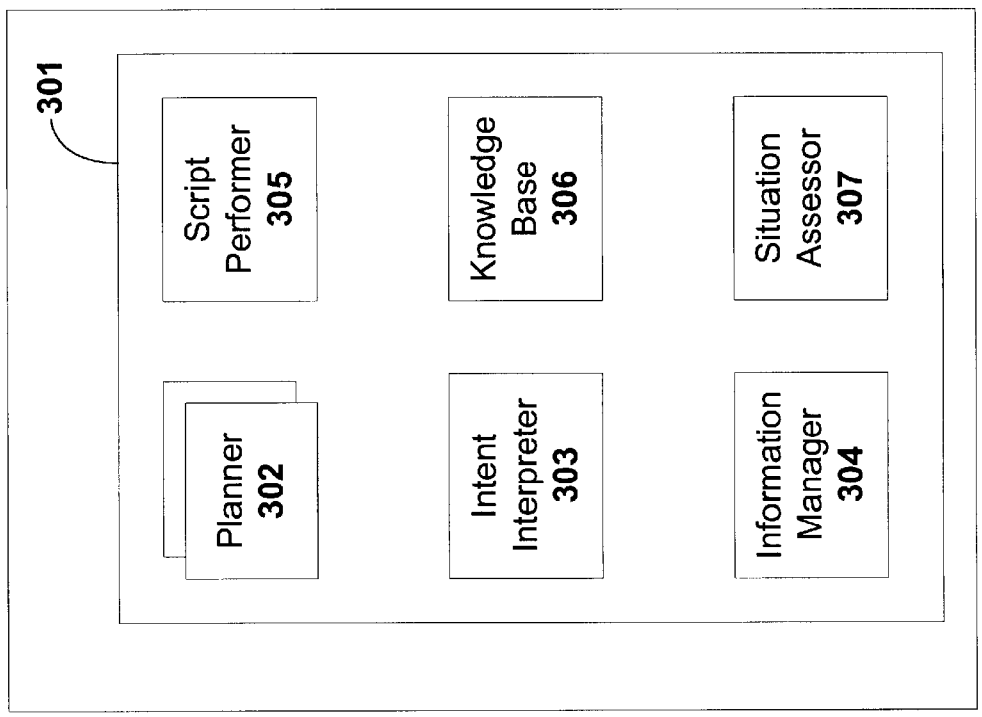
FIG. 3 illustrates an inference engine according to one embodiment of the present invention.

One embodiment of the present invention is implemented using an inference engine 301 such as the one described in FIG. 3 including one or more planners 302, an intent interpreter 303, an information manager 304, a script performer 305, a knowledge base 306, and a situation assessor 307. Each of these components is described in more detail below. In addition, the following publications describing various exemplary implementations of the constituent components of an inference engine are hereby incorporated by reference: (1) Hoshstrasser, Belinda Hardman and Norman D. Geddes. Proceedings of the International Joint Conferences on Artificial Intelligence 1989 Workshop on Integrated Human-Machine Intelligence in Aerospace Systems. OPAL: *Operator Intent Inferencing for Intelligent Operator Support Systems*. (Aug. 21, 1989); (2) Geddes, Norman D., et al. *Fostering Collaboration in System of Systems*; (3) Rouse, William B., et al. An Architecture for Intelligent Interfaces: Outline of an Approach to Supporting Operators of Complex Systems. Human-Computer Interaction, vol. 3, pp. 87–122 (1987); (4) Geddes, Norman D. and Mark A. Hoffman. *Supervising Unmanned Roving Vehicles Through an Intelligent Interface*; (5) Geddes, Norman D., et al. *Automated Acquisition of Information Requirements for an Intelligent Display*; (6) Miller, Christopher A., et al. Plan-Based Information Requirements: Automated Knowledge Acquisition to Support Information Management in an Intelligent Pilot-Vehicle Interface. Digital Avionics Systems Conference (Seattle, Washington, Oct. 5–9, 1992); (7) Geddes, Norman D., Large Scale Models of Cooperative and Hostile Intentions. *IEEE Computer Society, International Conference and Workshop on Engineering of Computer Based Systems* (ECBS'97) (Monterey, Calif., Mar. 27–28, 1997); (8) Webb, Barry W., Norman D. Geddes, and Leslie O. Neste. *Information Management with a Hierarchical Display Generator*; (9) Rouse, W. B., N. D. Geddes, and J. M. Hammer. Computer-aided fighter pilots. *IEEE Spectrum*. pp.38–41 (Mar. 1990); (10) Geddes, N. D. and R. J. Lee. Intelligent Control for Automated Vehicles: A Decision Aiding Method for Coordination of Multiple Uninhabited Tactical Aircraft. *Association for Unmanned Vehicle Systems International AUVSI'98 25th Annual Symposium and Exhibition*. (Huntsville, Ala., Jun. 8–12, 1998); (11) Geddes, N. D., R. J. Lee, and J. L. Brown. A Portable Lightweight Associate for Urban Helicopter Pilotage. *Submitted to IEEE* (Sep. 25, 1997); and (13) Geddes, N. D. "Associate Systems: A framework for human-computer cooperation." *7th International Conference of Human-Computer Interaction*. (San Francisco, Calif., Aug. 24–29, 1997).

First, we discuss the one or more planners 302. Any conventional planner can be used with the present invention;

however, the preferred embodiment uses a realtime, partial-order planner. Such a planner is able to effectively manage real-time operation in a changing world. During the network management process, the current state of the system is constantly changing. For example, hosts are losing and gaining network access, users are logging on to the firewall, customers are accessing various servers, etc. A system that only plans as far as necessary for given constraints conserves resources by preventing excessive planning in a dynamic environment where preferences, goals, and intentions are always changing.

In one embodiment of the present invention, the partial order, least commitment planner uses an abstract decomposition of the network management objectives. This decomposition is represented as a plan and goal graph (PGG), an acyclic, directed graph that represents the hierarchy of possible goals that may be pursued to achieve an intention and the methods (or plans) that can be used to satisfy each goal. Broad, general plans are represented by plan nodes of the PGG that are higher in the directed acyclic graph structure, while lower-level plan sub-elements provide increasing levels of detail in the lower levels of the PGG. A partial order planning system using a plan and goal graph (PGG) is described by N. D. Geddes and R. J. Lee in a paper entitled "Intelligent Control for Automated Vehicles: A Decision Aiding Method for Coordination of Multiple Uninhabited Tactical Aircraft" published June 1998.

Traditional network management systems either have no planner at all or use a full-order planner. A planner determines a sequence of activities that can be taken to achieve as many desired states or goals as possible given available resources and domain constraints. A full order planner determines the "optimal" sequence of activities to be taken. Because this process requires searching all combinations of activities to determine the best combination, it is order n-cubed or worse in the number of activities. Partial order planners compute less than the "optimal" sequence of activities to be taken. For example, one type of partial order planner is a least commitment planner that operates by committing to as little as possible, thus reducing exponential growth of the search space resulting in increased planning speed. Since all plans are not necessarily considered, a partial order planner may not find the optimal sequence of activities for reaching one or more goals; however, a plan that satisfies domain and resource constraints will be quickly provided and the resulting plan can be recalculated as changes occur.

Figure 6:
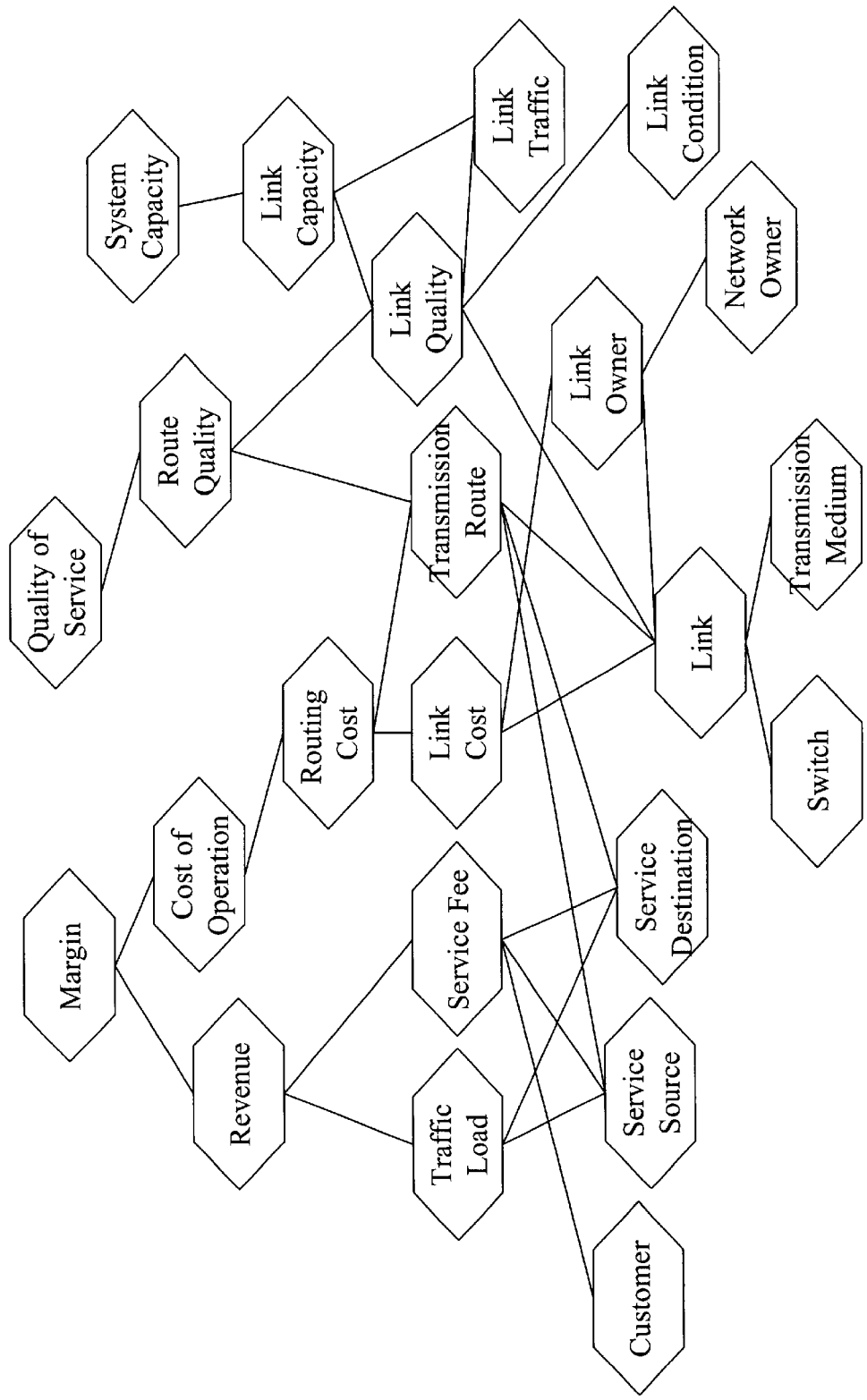
FIG. 6 illustrates a portion of a concept graph according to one embodiment of the present invention.

In one embodiment of the present invention, the planner 302 is a partial order planner and manages its level of commitment to the activities in the plan by using a state transition method to set the life cycle states of plan sub-elements. By providing graded levels of commitment, the planner 302 can continue to plan about alternative activities without having to make a commitment to the selection of a specific activity until later. One embodiment of the plan life cycle state transitions is shown in FIG. 6. As a plan sub-element moves through its life cycle states from candidate towards the active state, the partial order planner is increasing its commitment to that plan sub-element. The partial order planner may also reduce its commitment by changing the plan sub-element state to rejected state or revoked state and ultimately to a terminated state. This mechanism provides a non-monotonic, graded level of commitment for each plan sub-element.

In one embodiment of the present invention, state transitions of the plan sub-elements are performed by the planner 302 in response to event signals received from the situation assessor 307. When the planner 302 moves a plan sub-element to a new life cycle state, the planner 302 requests the activation of specific monitors within situation assessor 307. In one embodiment of the present invention, the monitors represent the conditions under which a plan sub-element should be transitioned to a different one of its plurality of life cycle states. The situation assessor 307 periodically evaluates the specific monitors that have been activated, and provides an event signal to the planner 302 for each specific monitor whose conditions are satisfied.

The intent interpreter 303 is an important component of the intelligent network management system in some embodiments. One embodiment of the present invention uses an intent interpreter similar to that described by B. H. Hoshstrasser and N. D. Geddes in a paper entitled "OPAL: Operater Intent Inferencing for Intelligent Operator Support Systems" published July 1989. In this embodiment, to create an intelligent interface, the system monitors a network operator's actions to determine what the operator is trying to accomplish. The intent interpreter does this using a task-analytic decomposition of the purposes of network operators within the communications network domain. This decomposition is represented as a plan and goal graph (PGG), an acyclic, directed graph that represents the hierarchy of possible goals that may be pursued to achieve an intention and the methods (or plans) that can be used to satisfy each goal. Additionally, intent interpreter 303 uses knowledge represented as scripts. These scripts are sequences of primitive actions whose execution may be dependent on the state of the execution context. Other embodiments may use scripts that may include non-primitive actions (e.g., recursive script calls or additional script calls). Scripts represent standard procedures or processes that are routinely used to perform specific network activities described by plan sub-elements. Such standard operational procedures may include standard responses to both normal and abnormal events and operating conditions within a network. The intent interpreter 303 uses reasoning on the PGG to represent problem solving behaviors that are necessary when existing network management procedures defined by scripts are not appropriate for the situation. Using assertions made by the other components of the system together with domain knowledge stored in knowledge base 206, the intent interpreter determines the most likely intent of a network operator. This determined intent is then used to update the information being displayed to the network operator and to generate one or more plans to satisfy the interpreted goals of the operator.

Script performer 305 can be used to execute multiple parallel situated scripts that are stored in knowledge base 306. As discussed above, these scripts are sequences of partially specified primitive actions whose execution is context sensitive. This components is a valuable tool to increase the efficiency of the system by supporting real-time monitoring, information display, and network modifications. The scripts can be thought of as a knowledge representation optimized for procedure execution; just as software executables can be viewed as optimized representations of source code.

The information manager 304 component of this embodiment of the present invention provides automatic information management features for the user interface. The information manager 304 uses knowledge stored in knowledge base 306 including the present intent of the network operator as determined by intent interpreter 303 to decide what information should be displayed to the network operator. Information needed by a user changes as the user's tasks and intentions change. This embodiment of the present invention uses a model to determine the information needed based on the current knowledge base. One embodiment of the present invention uses an information manager 304 similar to that described in an article by B. W. Webb, N. D. Geddes, and L. O. Neste entitled "Information Management with a Hierarchical Display Generator." This article describes an implementation of a system that selects and tailors the format of displayed information to the tasks being performed by a user.

Finally, knowledge base 306 stores all knowledge patterns and instances used in the system to conduct reasoning including plans, scripts, assertions, relationships, frames, etc. Situation assessor 307 maintains the consistency of the instances within the knowledge base 306 by identifying and resolving any inconsistent or outdated beliefs. In one embodiment of the present invention, the situation assessor uses a concept graph to update data values and beliefs. A concept graph is a knowledge representation of the dependencies between observable data values and higher-level computations and assertions made about the data.

In one embodiment of the present invention, the concept graph includes one or more means for calculating the degree of belief that the situation assessor 307 has in the values of each concept. One such means for calculating belief is Bayes Formula. When the situation assessor 307 receives new data, concepts that depend on that data are updated and their belief values are also updated. As a result of the updated belief values, the situation assessor 307 may reduce its belief in a concept, providing for non-monotonic truth maintenance for the situation assessor 307.

The next embodiment of the present invention uses a network management console similar to those embodiments describe above; however, this embodiment also includes intelligent agents installed on network devices to increase the functionality and performance of the system.

Each intelligent agent includes an inference engine as shown in FIG. 3 and discussed above. For example, in this embodiment, firewall 103 includes an intelligent agent that performs the same functions as the network management console inference engine shown in FIG. 3. One of ordinary skill will appreciate that the intelligent agent can be implemented on firewall 103 by encoding the necessary expert knowledge using conventional techniques.

Figure 4:
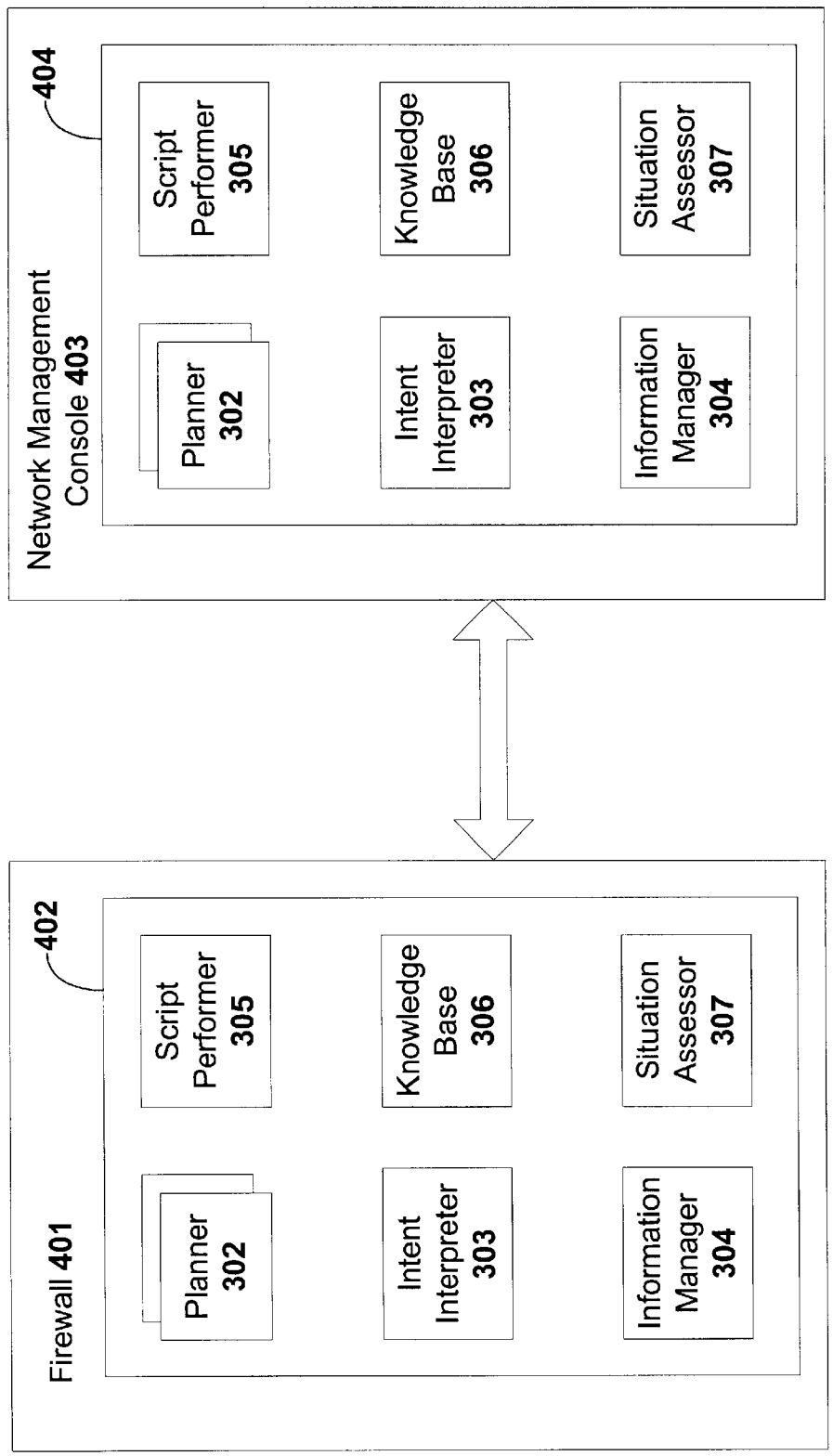
FIG. 4 is a block diagram showing a distributed, intelligent agent system in which a firewall intelligent agent and a network management console intelligent agent performed distributed situation assessment.

FIG. 4 shows a block diagram of a firewall 401 with embedded intelligent agents 402 connected to a network management console 403 including an intelligent agent 404. In this manner, the situation assessor 307 of the firewall and of the network management console share information from the knowledge base to create a shared, distributed situation assessment.

The following is a simplified illustrative embodiment showing the interactions between the various components of the inference engine. Consider an intelligent decision support system to assist a team of humans in collaborative network management across several independently owned network stages.

The starting point for the planning cycle is the posting of a high-level goal instance from a plan-goal graph (PGG). The posting of a goal triggers a planning cycle that involves decomposing and specializing high-level goals into low-level actions that can be executed to achieve that goal. Each goal in the PGG has one or more child plans, some of which can be decomposed into actions which can be executed directly and some that must be recursively decomposed into sub-goals and sub-plans and specialized until the primitive steps (actions) are reached. Because the planner is a least commitment planner, commitment to a specialization created during decomposition is limited to only those aspects of the plan for which commitment cannot be deferred. If the system has been configured to interact closely with a human, candidate plans that are successfully decomposed and specialized may be proposed to the operator.

Figure 5:
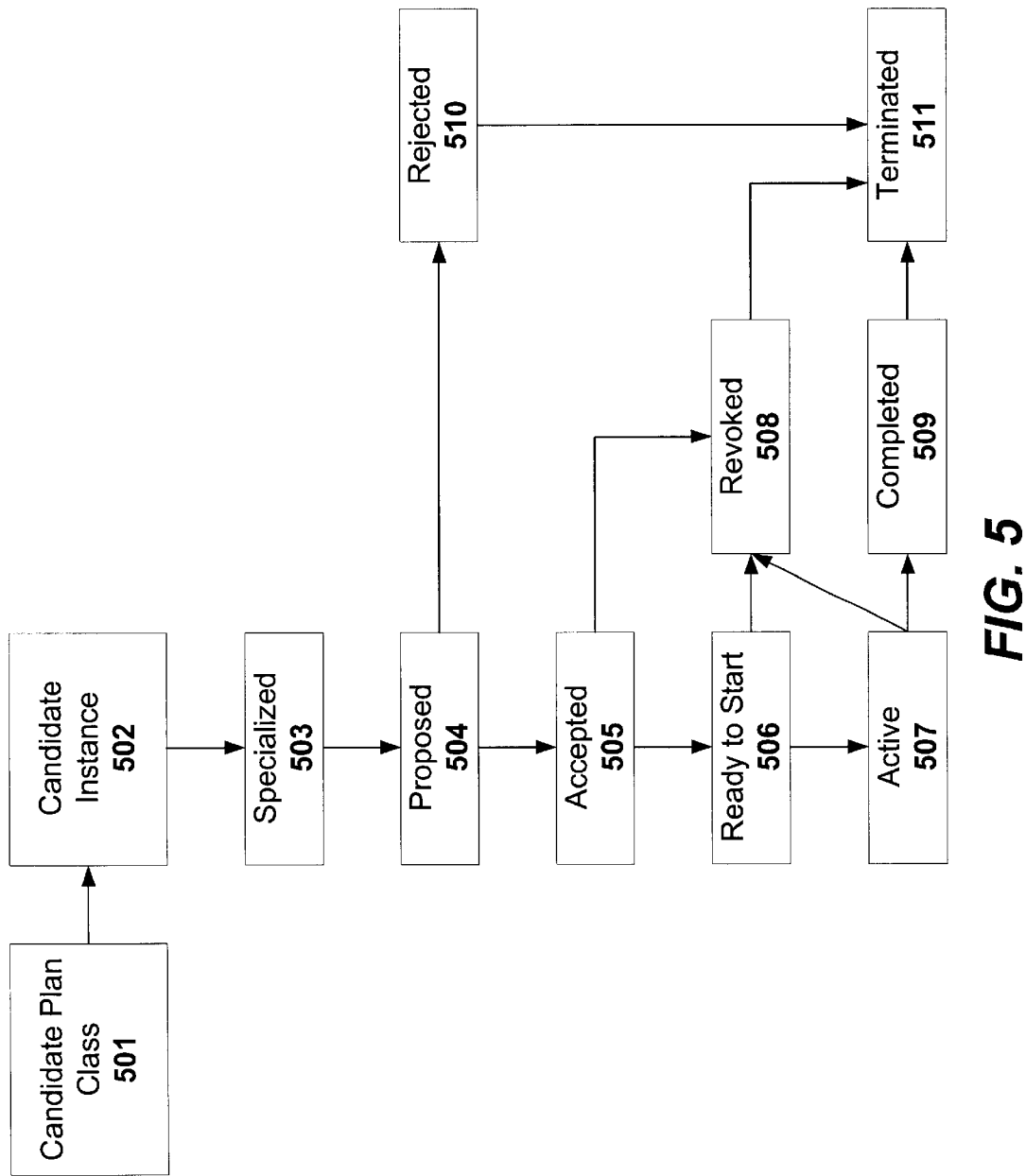
FIG. 5 is a block diagramming describing the life cycle of a plan maintained by a planner according to one embodiment of the present invention.

In addition to creating the decomposition of a plan into its sub-elements, the planner manages the specific life cycle states of each sub-element of a plan. The life cycle states, depicted in FIG. 5, provide the mechanism for managing the commitment of the system to the each of the plan sub-elements. Each of the life cycle states of a plan sub-element has specific monitoring knowledge associated with it, serving to focus the processing of the situation assessor and providing for an event-based control of the planner.

Throughout the life cycle of a PGG plan or goal, the dynamic planner maintains the parameters of the plan or goal and monitors for its success or failure. As a result, the planner can dynamically adjust plan parameters that mediate its execution and dynamically reselect and specialize children of a node as required.

The operation of the system begins in the situation assessor 307. In the is simplest embodiments, this component monitors and reads inputs to the system. The situation assessor 307 uses the inputs it receives to add data to the knowledge base regarding the current state of the system. For example, in the present embodiment, the system monitors a user's key presses and mouse clicks to add facts or observations to the knowledge base 306. It may also collect data from switching systems and financial systems to update the situation of importance to network management.

FIG. 6 shows a concept graph according to one embodiment of the present invention. The situation assessor 307 stores knowledge about the situations of possible interest in the knowledge base 306 in the form of a concept graph such as the one shown in FIG. 6. The concept graph specifies the relationships between lower level data and higher level concepts. The situation assessor 307 creates concept instances which represent specific data and conclusions that it determines based on its data inputs. The concepts may represent highly aggregated and abstract conclusions about the situation of the network and its business operations. Each concept is capable of having monitors defined for it that can be activated by the planner 302 as the life cycle states of plans and goals change over time. For example, in FIG. 6, the concept graph shows the relationship between the concept of Routing Cost and the concepts of Link Cost and the Transmission Route.

A monitor is a data input that can be defined by the system. Instead of monitoring all possible inputs at one time, embodiments of the present invention provide a mechanism for identifying what data is actually needed. A monitor corresponding to the needed data is then activated so that the needed data can be collected and used in the decision support process.

In this embodiment, the situation assessor 307 can also send and receive copies of concept patterns and instances by communicating with other network management systems also containing a situation assessor 307 and a knowledge base 306. The communication may be achieved by a plurality of methods including local networks, direct connection and wide area networks such as the Internet.

Whenever a new fact is added to the knowledge base 306, the situation assessor 307 processes any monitors related to the new fact. If a monitor is found to be satisfied, an event is generated to the planner 302 that causes the planner to update its planning.

Whenever a new fact is added to the knowledge base 306 that represents the execution of a primitive action by the user, the intent interpreter 303 processes the new assertion to update a model of the current intent of the user. The intent interpreter uses a PGG model of user intentions such as the portion of the one shown in FIG. 7.

Figure 7:
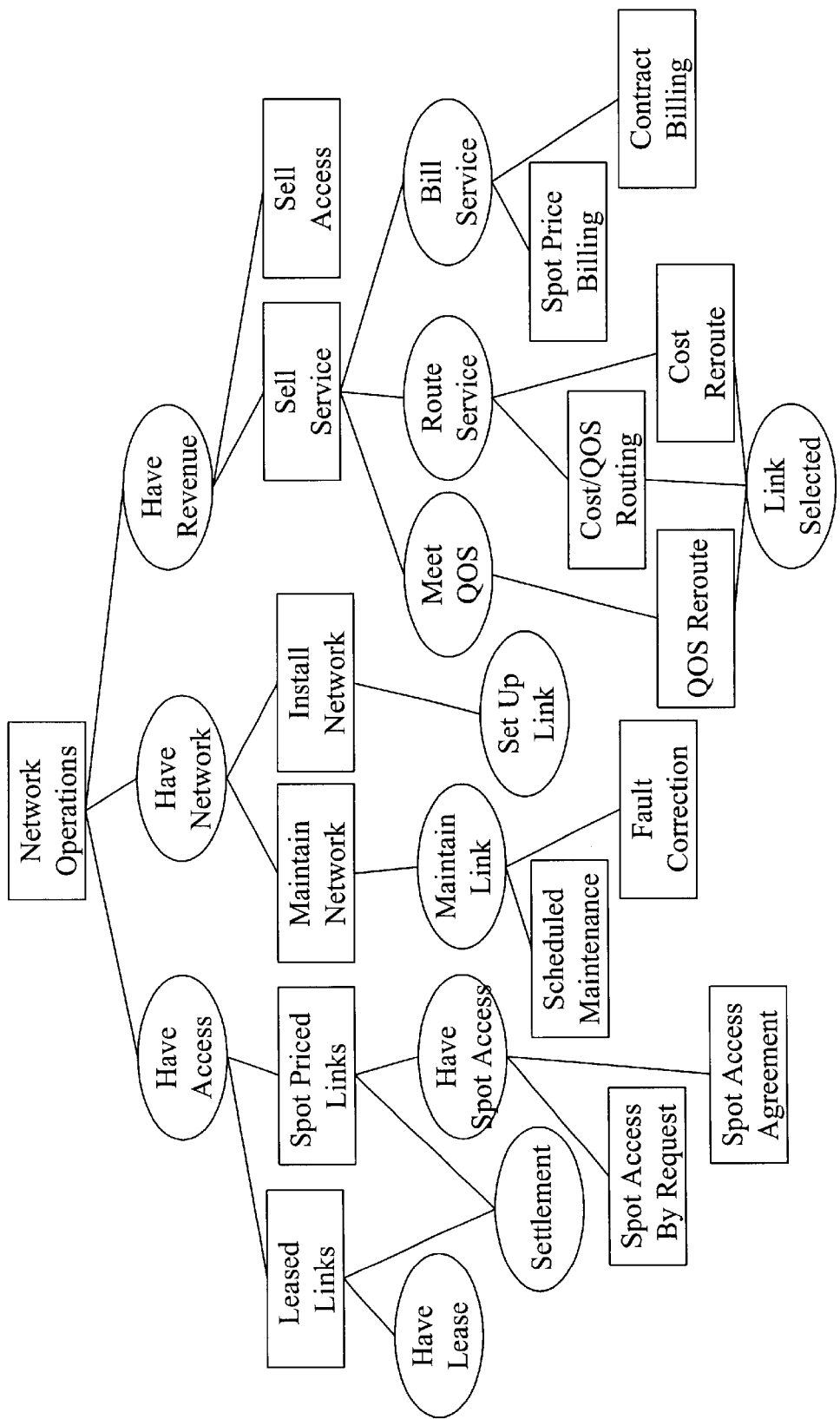
FIG. 7 illustrates a portion of a plan-goal graph (PGG) according to one embodiment of the present invention.

FIG. 7 shows a portion of a PGG model of user intentions. For example, the top-level plan is Network Operations. This plan can be decomposed into three goals: (1) Have Access, (2) Have Network, and (3) Have Revenue. These goals can, in turn, be decomposed into further plans and so on. A plan may also have a script for completing a plan associated with it or a goal may be fully decomposed into one or more primitive actions.

The intent interpreter 303 searches through the system's PGG models of user intention to determine the possible and likely intentions of the current user. The intent interpreter 303 then instantiates one or more goals based on the current perceived intentions of the user.

Figure 8:
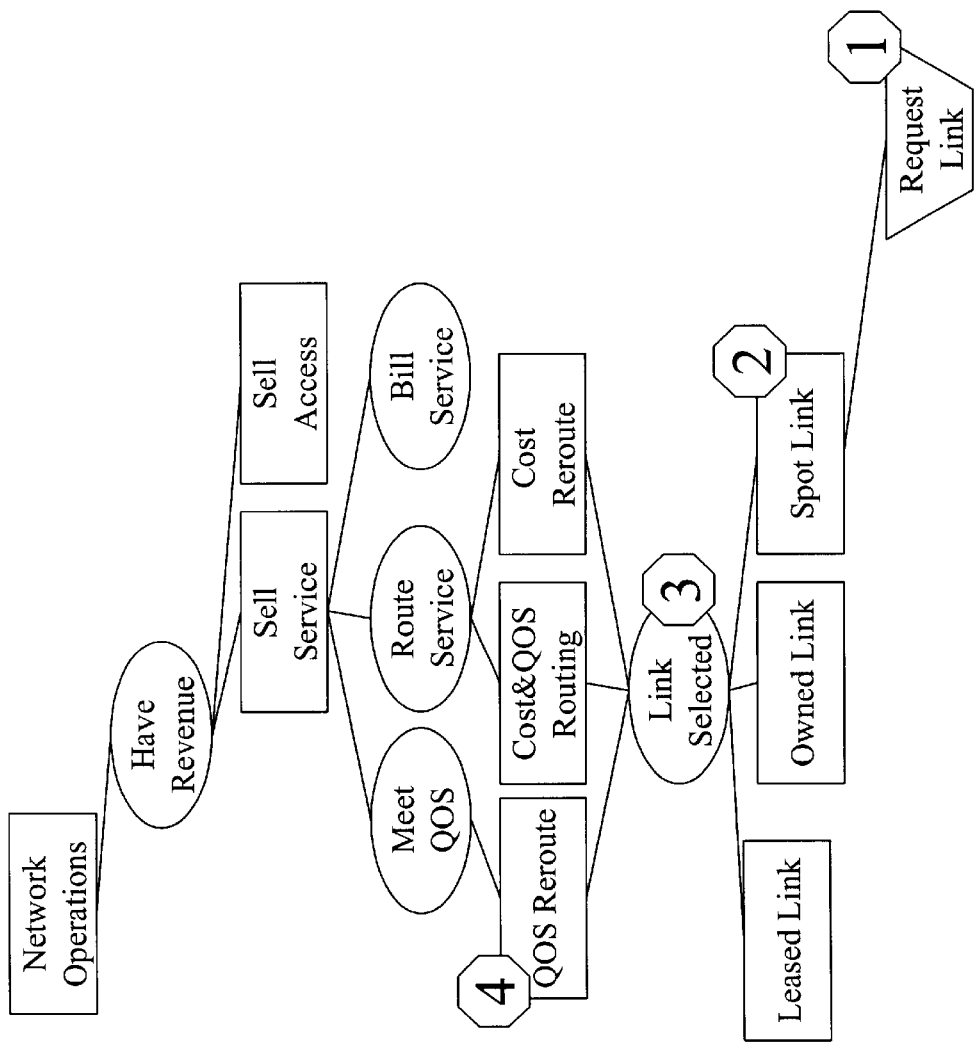
FIG. 8 describes a goal instance created by an intent interpreter according to one embodiment of the present invention.

In FIG. 8, a user within the Network Operations Center (NOC) of Company A performs a primitive step or action at the user interface by placing a link request (1) with a specific network company to carry a load of traffic over a particular link from a source to a destination. The intent interpreter 303 searches for an explanation of this action, and finds in the knowledge base that the network company has a spot traffic carrying agreement with the requesting Company A. The intent interpreter 303 tentatively hypothesizes that the user plans to use a short-term, spot-priced link as the plan (2) for satisfying the goal to select a link (3) as a part of some service routing plan. The intent interpreter 303 then searches for a higher level plan within the knowledge base 306 that explains the goal, and finds that there is an active plan for performing a rerouting of traffic to improve the quality of service (QOS) (4). Hence, the intent interpreter 303 instantiates the plan (2) and the goal (3) within the knowledge base 306. The posting of the new goal starts the planner 302 to consider if there are more effective alternative plans for the goal, such as using an owned or leased link as a part of the service route.

The intent interpreter 303 uses non-monotonic reasoning in its search through the PGG knowledge in the knowledge base 306. If it is unable to find a complete path in the PGG from a hypothesized node to one known to be active, it can back up, retract its earlier assumptions and explore other paths.

In this embodiment, the intent interpreter 303 also sends and receives copies of plan and goal patterns and instances by communicating with other network management systems that contain an intent interpreter 303 and a knowledge base 306. The communication may be achieved by a plurality of methods, including local network, direct connection, and wide area networking such as the Internet.

Whenever a goal changes, or whenever a monitor event is received from the situation assessor 307, the planner 302 determines if any further planning needs to take place. For example, if the intent interpreter 303 instantiates a new goal, then the planner 302 needs to create a plan for achieving that goal. In the preferred embodiment, the planner 302 is a least commitment planner that performs a search of the PGGs stored in knowledge base 306 to determine subgoals and actions that need to be taken.

When goal instances and plan instances change life cycle state, the planner 302 uses knowledge in the knowledge base 306 to determine if any of the newly changed or updated goal or plan instances are in conflict with any other goal or plan instances. If a conflict is detected, the planner 302 sends a notification to the user interface.

Figure 9:
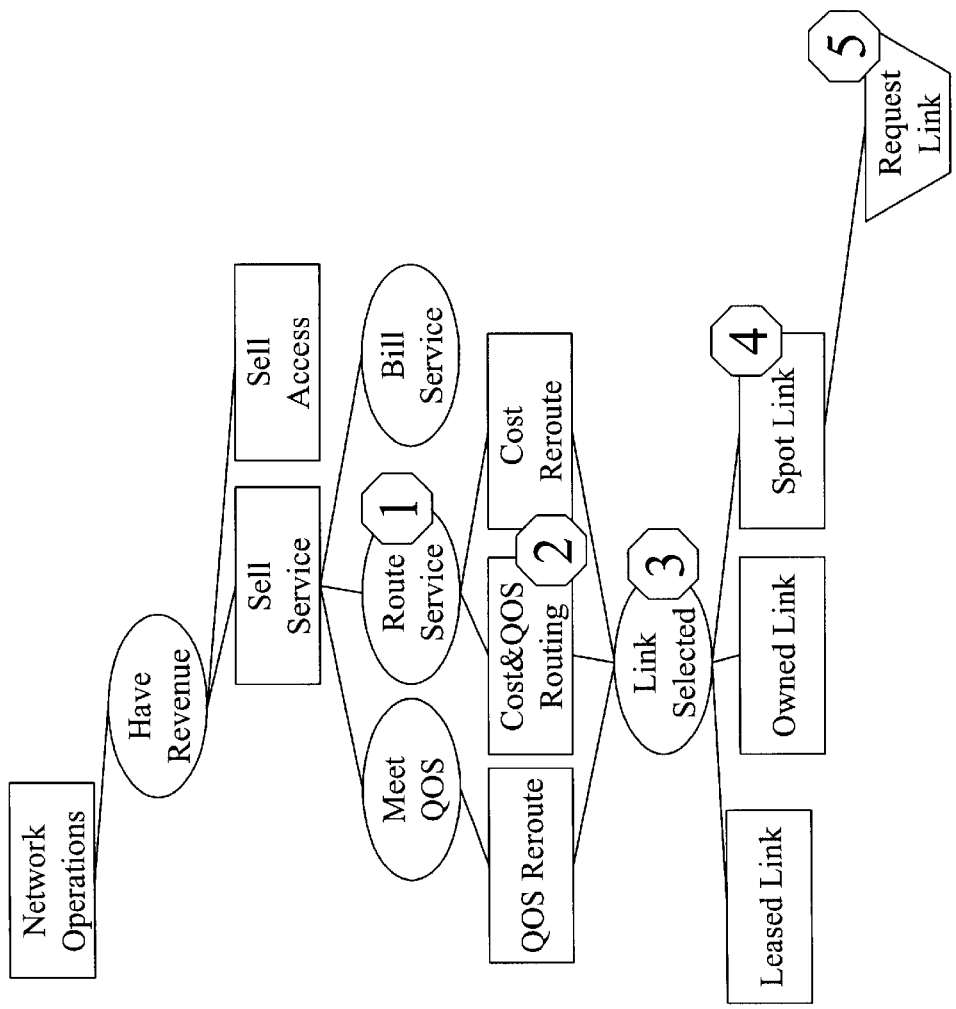
FIG. 9 depicts a portion of a plan-goal graph (PGG) illustrating the operation of a planner according to one embodiment of the present invention.

In FIG. 9, a user at the NOC for Company A enters data defining the goal to route data service from a source to a destination (1) in response to an order. The planner 302 uses knowledge in the knowledge base 306 to determine that the appropriate plan for the service route should meet both cost and QOS limits (2). This plan has multiple subgoal instances, all of the same goal class, Link Selected (3). The planner 302 uses knowledge in the knowledge base 306 to determine the link selection order. After the route is active, a monitor is satisfied reporting that a spot price for a link has dropped below the current price of a selected link in use. The planner 302 then explores the plan to reroute to reduce costs (2) as a solution of the route service goal. The planner 302 determines that a spot link use (4) will be more effective than either a leased or owned link and proposes this solution, leading to action (5).

One optimization that is made in the present embodiment is the use of script performer 305. In a particular domain, many plans are commonly encountered and constitute a body of accepted methods known to practitioners within the domain. These plans can be implemented as scripts that represent partially specified procedures that can be executed without the need for extensive planning. The script performer 305 is a component of the present embodiment that facilitates the execution of scripts. These scripts are represented in the system's PGGs that are a part of the knowledge base 306. The script performer 305 can perform many and possibly all of the primitive actions that could be performed by a human user, but the script performer 305 is limited by a set of permissions provided by the human operator.

As an example, consider the goal of selecting a link in a network service route, and its child plans for setting up a leased link, an owned link or a spot use link. Because the processes of setting up any of these types of network links is a well-defined and frequently recurring sequence of primitive actions, it can be represented as a script. The representation of the goal, its child plan, the script, and the relationship between the plan and the script are all a part of the knowledge base 306.

When a specific instance of the goal of selecting a link, such as the goal for selecting the link from Atlanta to Dallas as a part of routing between Athens, Ga. and Abilene, Tex., the planner 302 can create the instance of the plan to use a spot link (purchased over the spot market at the moment). If the script performer 305 has been given permission, it can execute the script and automatically send the requests to the necessary involved network elements.

The components described above provide a mechanism for assessing the current situation or state of system, planning one or more responses and executing the course of action. The information manager 304 is used to display information to a user or to update the user's display based on the current intentions or plans that have been identified by the planner 302 and the intent interpreter 303 using the knowledge base 306, the script performer 305, and the situation assessor 307.

For example, the knowledge base 306 contains a representation of the information that a human user would need to access if he was involved in a plan to reroute service to improve QOS. One type of information relevant to a plan of this kind might be the specific link quality conditions over alternate links between the source and the destination of the route. When an instance of such a plan is created, such as QOS Reroute from Atlanta to Dallas for a specific time interval, the information manager 304 uses the attributes of the plan and the knowledge base 306 to determine that the link QOS between Atlanta and Chattanooga and Chattanooga and Dallas is of interest to the human. The information manager 304 then commands the display presentations to show the appropriate QOS forecast map for the correct region and time period.

Embodiments of the present invention have now been fully detailed. It will be appreciated that these examples are merely illustrative of the present invention. Many variations and modifications will be apparent to those of ordinary skill in the art.

What is claimed is:

1. A method for providing intelligent decision support in a network management console, the method comprising:
    monitoring actions received by a network management console from a plurality of network operators;
    using the actions received by the network management console to determine the intent of a human network operator using an inference engine coupled to a knowledge base; and
    updating a network management console display based on the determined intent of the human network operator by using active, goal-directed planning and conflict detection in intentions between the plurality of network operators.

2. The method of claim 1, wherein the act of monitoring actions includes monitoring one or more from the group consisting of: monitoring key presses; mouse clicks; and mouse movements.

3. The method of claim 1, further including: determining a plan for carrying out a determined intention.

4. The method of claim 3, wherein the act of determining a plan is performed using the inference engine.

5. The method of claim 4, wherein the inference engine includes one or more from the group consisting of: a non-monotonic truth maintenance system, and a partial-order planner.

6. The method of claim 1, wherein the network management console is used to monitor a communications network, the communications network including one or more from the group consisting of: data communications, voice communications, and video communications.

7. The method of claim 1, wherein the act of determining the intent of a human operator includes detecting conflicts in intentions between a plurality of network operators.

8. A intelligent decision support system for managing a communications network, the system comprising:
    a knowledge base including expert knowledge about communication networks;
    an inference engine coupled to the knowledge base, the inference engine determining the intent of a network operator; and
    a network management system that monitors a communications network, collecting data from a plurality of network devices and network operators;
    a graphical user interface system that displays information regarding the communications network;
    wherein the information displayed by the graphical user interface system is modified based on the determined intent of the network operator by displaying information most pertinent to network operator's goals and plans and notification of detected potential conflicts between one or more of the plurality of network operators.

9. The system of claim 8, wherein the knowledge base includes one or more plan and goal graphs.

10. The system of claim 8, wherein the knowledge base includes one or more concept graphs.

11. The system of claim 8, wherein the knowledge base includes one or more scripts, each of the one or more scripts comprising a weakly-ordered, partially specified sequence of actions.

12. The system of claim 8, wherein the inference engine includes a partial order planner.

13. The system of claim 8, wherein the inference engine detects potential conflicts in intentions between a plurality of network operators and provides notification of the detected potential conflicts to one or more of the plurality of network operators.

14. The system of claim 8, wherein the inference engine includes a non-monotonic truth maintenance system.

15. The system of claim 8, wherein the communications network includes one or more from the group consisting of: data communications, voice communications, and video communications.

16. The system of claim 12, wherein the inference engine creates one or more plan instances.

17. The system of claim 16, wherein the inference engine manages life cycle states of the one or more plan instances according to a commitment level of the partial order planner.

18. The system of claim 17, wherein the inference engine manages monitoring of actions received by the network management system using the one or more concept graphs according to the life cycle states of the one or more plan instances.

19. The system of claim 18, wherein the inference engine determines what further processing is needed by the partial order planner based on the monitoring of action received by the network management system.

20. A network management system comprising:
    a plurality of intelligent agents, each of the plurality of intelligent agents including:
    a knowledge base including expert knowledge about communication networks;
    an inference engine coupled to the knowledge base, the inference engine including a partial order planner;
    a network management system that monitors a communications network, collecting data from and distributing data to a plurality of network devices and network operators; and
    a graphical user interface system that displays information regarding the communications network wherein the information displayed by the graphical user interface system is modified based on a determined intent of a network operator by displaying information most pertinent to network operator's goals and plans and notification of detected potential conflicts between one or more of the network operators.

21. The system of claim 20, wherein the knowledge base includes one or more concept graphs.

22. The system of claim 21, wherein each agent of the plurality of intelligent agents determines the intentions of one or more users and wherein the data management system of a first agent of the plurality of intelligent agents shares data with a second agent of the plurality of intelligent agents representing the determined intentions of the one or more users to facilitate collaboration.

23. The system of claim 22, wherein the system uses the shared data to automatically detect conflicts between the one or more users.

* * * * *